April 28, 1970   L. A. SCHULD   3,508,670
BIN UNLOADER

Filed Aug. 26, 1968   2 Sheets-Sheet 1

Leo A. Schuld
INVENTOR.

BY
Attorneys

Leo A. Schuld
INVENTOR.

United States Patent Office
3,508,670
Patented Apr. 28, 1970

3,508,670
BIN UNLOADER
Leo A. Schuld, Mosinee, Wis., assignor to Schuld Manufacturing Co., Inc., a corporation of Wisconsin
Filed Aug. 26, 1968, Ser. No. 755,042
Int. Cl. B65g 65/46
U.S. Cl. 214—17
8 Claims

ABSTRACT OF THE DISCLOSURE

A rotatable angled auger assembly for a storage bin including inverted conical lower walls, the auger assembly including a driven angled auger screw supported at its lower end from a driven rotary mount supported for rotation about a vertical axis in the lower end of the bin for sweeping the auger screw about the inverted conical lower walls of the bin. The drive for the auger screw includes excess torque input control means operable not to exceed a predetermined normal driving input torque to the rotary mount and to maintain such predetermined normal input torque should resistance to turning of the mount exceed said predetermined torque.

---

This invention relates generally to the provision of an apparatus for the removal of bulk materials from storage bins or silos and the like including vertical conical lower walls and is operative to perform a complete clean-out of the bin or silo.

The unloader includes an auger feed screw which is inclined and parallels the inner surfaces of the conical lower or bottom wall portion of the associated bin. The lower end of the auger screw is supported for rotation about a vertical axis coinciding generally with the center line of the inverted conical lower portion of the associated bin and in this manner the auger screw may be caused to sweep about the inverted conical lower walls of the bin to positively eliminate "bridging." Drive means is provided for rotating the auger feed screw about its longitudinal axis and further drive means is provided for causing the auger screw to sweep about the internal surfaces of the inverted conical lower walls of the associated bin. This further drive means is provided with an automatic overload releasing mechanism whereby driving of the auger screw in a sweeping movement about the lower walls of the bin will be interrupted at any time resistance to this sweep movement of the auger screws exceeds a predetermined maximum. However, the mechanism, while being operative to interrupt positive driving of the auger screw in a sweeping movement is operative to maintain substantially the same torque which was being applied to sweep the auger screw at the time the operation of the drive motor therefor was terminated until such time as the resistance to sweeping movement of the auger screw is overcome and the auger screw resumes its sweeping movement, under power of a built-in force means of the overload releasing mechanism, after which operation of the drive for effecting sweeping movement of the auger screw is again initiated.

By this type of construction, substantially uninterrupted operation of the bin unloader is assured without endangering, by overloading, the drive mechanism thereof operative to cause the auger screw to sweep about the lower end of the associated bin.

The main object of this invention is to provide a bin unloader for use in conjunction with storage bins having inverted conical lower walls and which will be operative to completely eliminate "bridging."

Another object of this invention, in accordance with the immediately preceding object, is to provide a bin unloader including a unique overload releasing mechanism which will enable continued operation of the bin unloader without danger of overloading any of the drive components thereof.

A final object of this invention to be specifically enumerated herein is to provide a bin unloader in accordance with the preceding objects which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
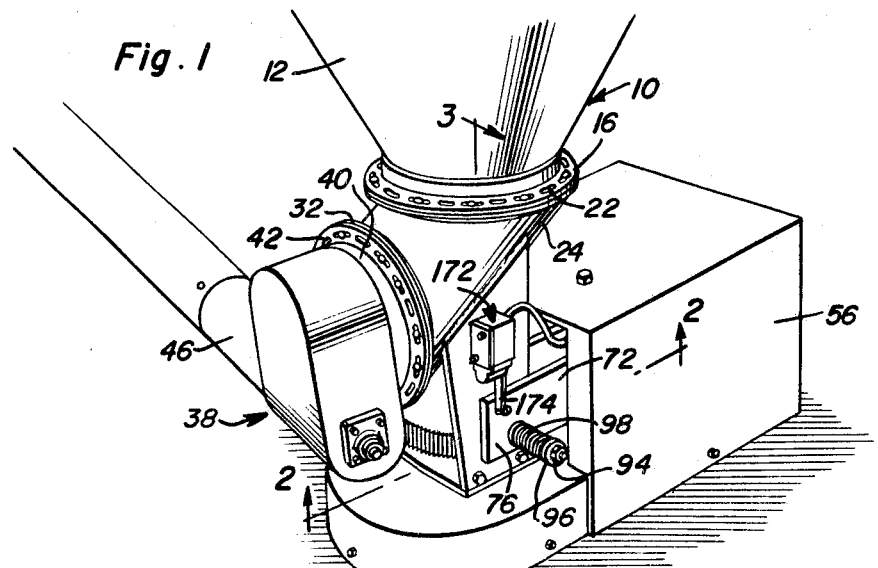
FIGURE 1 is a perspective view of the bin unloader of the instant invention operatively associated with the lower end cone of a storage bin to unload bulk materials therefrom and also operatively associated with an adjustable discharge auger for conveying the unloaded material to a remote location.

Referring now more specifically to the drawings, the numeral 10 generally designated a bulk feed bin including inverted truncated cone-shaped lower or bottom wall portions 12 which are inclined approximately sixty degrees relative to a horizontal plane. The lower ends of the wall portions 12 terminate downwardly in a vertically short cylindrical extension 14 to which an annular support member 16 is secured in any convenient manner such as by welding. The support member 16 is L-shaped in cross-section and includes a vertical flange 18 and a horizontally outwardly projecting flange 20 having a plurality of circumferentially extending and equally circumferentially spaced slots 22 formed therein.

A full flow tube or boot 24 is provided and includes oppositely beveled opposite ends including cylindrical extensions 26 and 28 which are similar to extension 14 and which have annular support members 30 and 32, respectively, similar to the support member 16 secured thereto. A plurality of suitable fasteners 36 are utilized to secure the horizontal flanges of the support members 16 and 30 together in adjusted rotated positions relative to each other and an auger tail piece generally referred to by the reference numeral 38 is provided and includes a housing inlet portion 40 which is generally cylindrical in configuration at its inlet end and includes a support member 42 similar to the support members 16, 30 and 32 which is secured to the support member 32 in adjusted rotated position by means of a plurality of fasteners 44. Also, the auger tail piece 38 includes a housing outlet neck portion 46 through which a driven conveying auger 48 is journalled. Accordingly, it may be seen that feed may be discharged downwardly from the bin 10, into the tube or boot 24 and thereafter into the housing inlet portion 40 for conveying to a desired location by means of the auger screw 48.

The tube or boot 24 includes a downwardly projecting support structure 50 and a journal sleeve 52 is supported from the support structure 50 and has its upper end secured through the lower wall portions of the tube or boot 24 with the center axis of the journal sleeve or tube 52 substantially coinciding with the vertical center axis of the inverted truncated cone-shaped lower wall portions 12.

A housing structure referred to in general by the reference numeral 54 is secured to the lower end of the support structure 50 and the housing structure 54 includes an outer covering 56 and stationarily supported upper and lower walls 58 and 60 enclosed by the cover 56 when the latter is installed. A pair of elongated and upstanding angle irons 62 and 64 extend and are secured between the upper and lower walls 58 and 60 and one side edge 66 of an upstanding end wall 68 is pivotally supported, by means of a pivot fastener 70, from journal brackets 72 supported from the angle iron 52. In addition, one end edge 74 of a side wall 76 is also pivotally supported from the pivot fastener 70.

The free side edge 78 of the end wall 68 is adjustably supported from the angle iron 64 by means of a pair of upper and lower bolts 80 pivotally secured to the side edge 78 as at 82 at one set of corresponding ends and secured through one flange of the angle iron 64 at the other set of corresponding ends by means of a pair of cam nuts 84 threaded on each bolt 80. Therefore, it may be seen that the end wall 68 may be angularly adjusted relative to the upper and lower walls 58 and 60.

Also, the free end edge 86 of the side wall 76 has an opening 88 formed therethrough within which a shank portion 90 is loosely received, one end portion of the shank or shank portion 90 being secured to the support structure 50 as at 92. The free end of the shank portion 90 projects through the opening 88 and has a threaded stop member or bolt 94 threaded thereon. An abutment cup 96 is disposed on the shank portion 90 ahead of the stop member 94 and a compression spring 98 is disposed about the shank member 90 between the abutment cup 96 and the side wall 76. Accordingly, the compression spring 98 yieldingly urges the free end edge portion 86 of the side wall 76 inwardly toward abutting engagement with the support structure 50.

Figure 3:
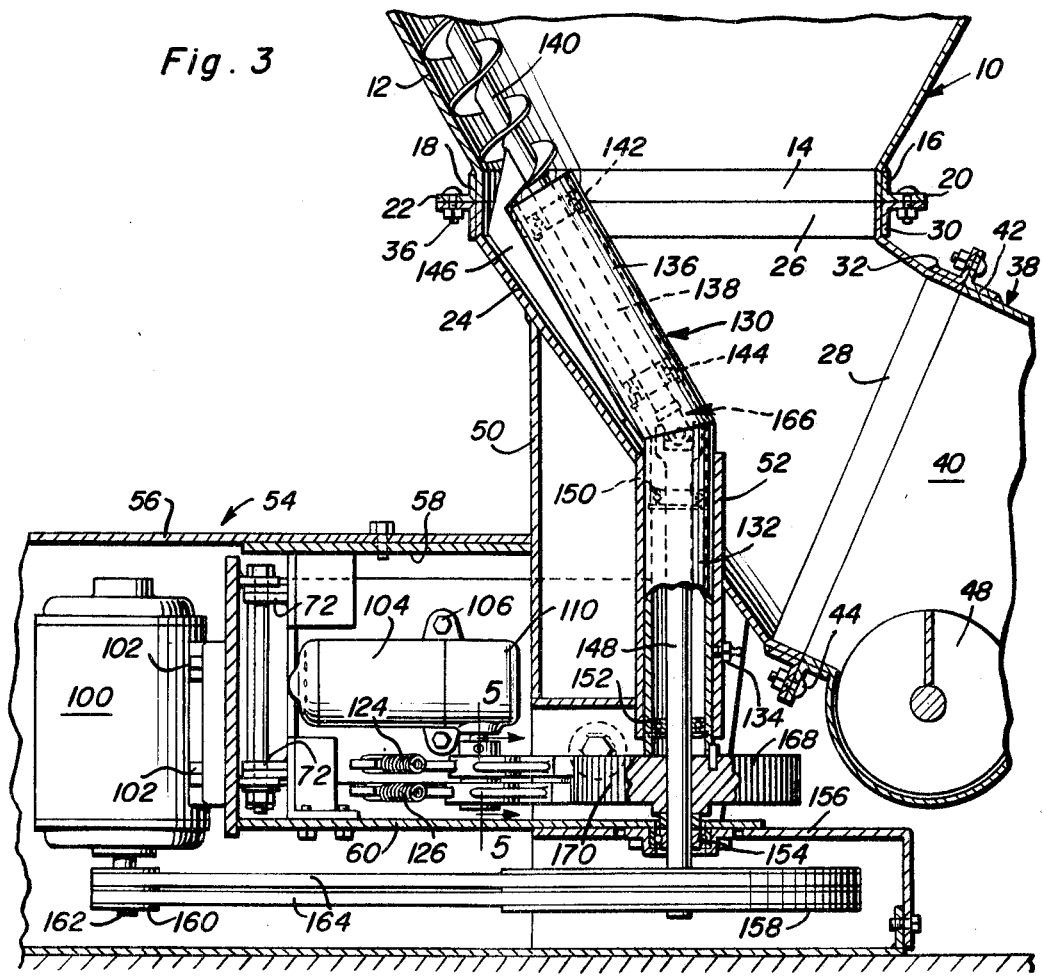
FIGURE 3 is an enlarged fragmentary vertical sectional view taken substantially upon the plane indicated by the section line 3—3 of FIGURE 1.
Figure 4:
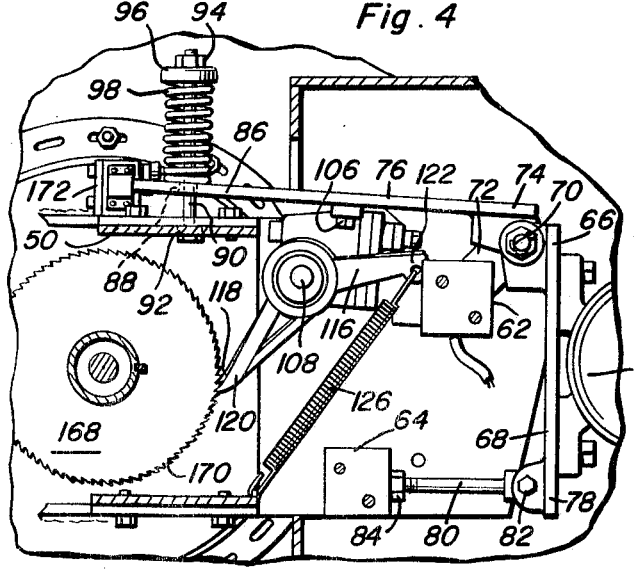
FIGURE 4 is a fragmentary horizontal sectional view similar to that of FIGURE 2 but with the operating components of the overload releasing mechanism of the instant invention in different positions of operation.
Figure 5:
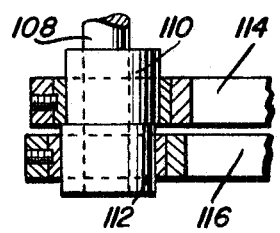
FIGURE 5 is an enlarged fragmentary vertical sectional view taken substantially upon a plane indicated by section line 5—5 of FIGURE 3.

An electric motor 100 is supported from the end wall 68 by means of fasteners 102 and an electric motor 104 is supported from the side wall 76 by means of fasteners 106 and drives an output shaft 108 of an angle gear drive assembly 110 supported from the motor 104. The output shaft 108 has a pair of axially spaced eccentric sleeves 110 and 112 secured thereon for rotation therewith and the eccentric sleeves 110 and 112 are journalled through the mid-portions of a pair of lever arms 114 and 116 including one set of corresponding ends defining relative dogs 118 and 120, respectively. The other set of corresponding ends of the lever arms 114 and 116 are each suitably apertured as at 122 and a pair of expansion springs 124 and 126 are secured between the apertured ends of the lever arms 114 and 116 and the support structure 50 whereby the ratchet dog defining ends 118 and 120 of the lever arms 114 and 116 are urged in counterclockwise directions as viewed in FIGURES 2 and 4 of the drawings. A sleeve structure referred to in general by the reference numeral 130 is provided and includes an upstanding vertically disposed lower end portion 132 journalled through the journal sleeve or tube 52, the latter including a grease fitting 134. The upper end portion 136 of the sleeve structure is inclined approximately sixty degrees relative to the horizontal and the lower end portion 138 of an inclined auger screw 140 is journalled in the upper portion or upper end portion 136 of the sleeve structure 130 by means of suitable bearing assemblies 142 and 144. The auger screw 140, as may be seen from FIGURE 3 of the drawings, closely overlies and generally parallels the inner surface of the lower wall portions 12 and includes a lower end finger 146 adapted to sweep about the upper end portion 136 of the sleeve structure 130 upon rotation of the auger screw 140 so as to prevent accumulation of bulk material between the upper end portion 136 of the sleeve structure 130 and the tube or boot 24.

A drive shaft 148 is journalled through the lower end portion 132 of the sleeve structure 130 by means of suitable bearing structures 150 and 152 and also a bearing structure 154 carried by a lower portion 156 of the support structure 150. A double flange pulley 158 is carried by the lower end of the drive shaft 148 and is aligned with a double flanged pulley 160 mounted on the output shaft 162 of the motor 100. A pair of endless flexible belts 164 drivingly connect the drive pulley 160 to the driving pulley 158 and the adjacent ends of the lower end portion 138 of the auger screw 140 and the drive shaft 148 are coupled together by means of a universal assembly 166 defined in part by both the lower end portion 138 and the drive shaft 140. In addition, the lower end of the lower end portion 132 has a large toothed wheeled 168 secured thereon for rotation therewith and through which the drive shaft 48 is journalled. The toothed wheel 168 includes circumferentially spaced teeth 170 with which the ratchet dogs 118 and 120 are engageable.

The electric motor 100 may be suitably connected to any source of electrical potential by means of any suitable circuitry including an on-off switch and also a fuse, if desired, as is conventional. In addition, the electric motor 104 may also be suitably electrically connected to the same electrical circuit through a control switch assembly 172 including a pivoted actuator 174 engaged with the side wall 176. In this manner, upon actuation of both of the motors 100 and 104, the auger screw 140 will be rotated about its longitudinal axis and the lower end portion 132 of the sleeve structure 130 will be rotated about a vertical axis so as to sweep the auger screw 140 about the lower wall portions 12 of the bulk feed bin 10. As the drive or output shaft 108 rotates, the eccentric sleeves 110 and 112 will oscillate the lever arms 114 and 116 in an inverse manner resulting in the ratchet dogs 118 and 120 engaging successive teeth 170 of the wheel 168 so as to slowly intermittently advance the wheel 168 and therefore rotate the lower end portion 132 of the sleeve structure 130.

Figure 2:
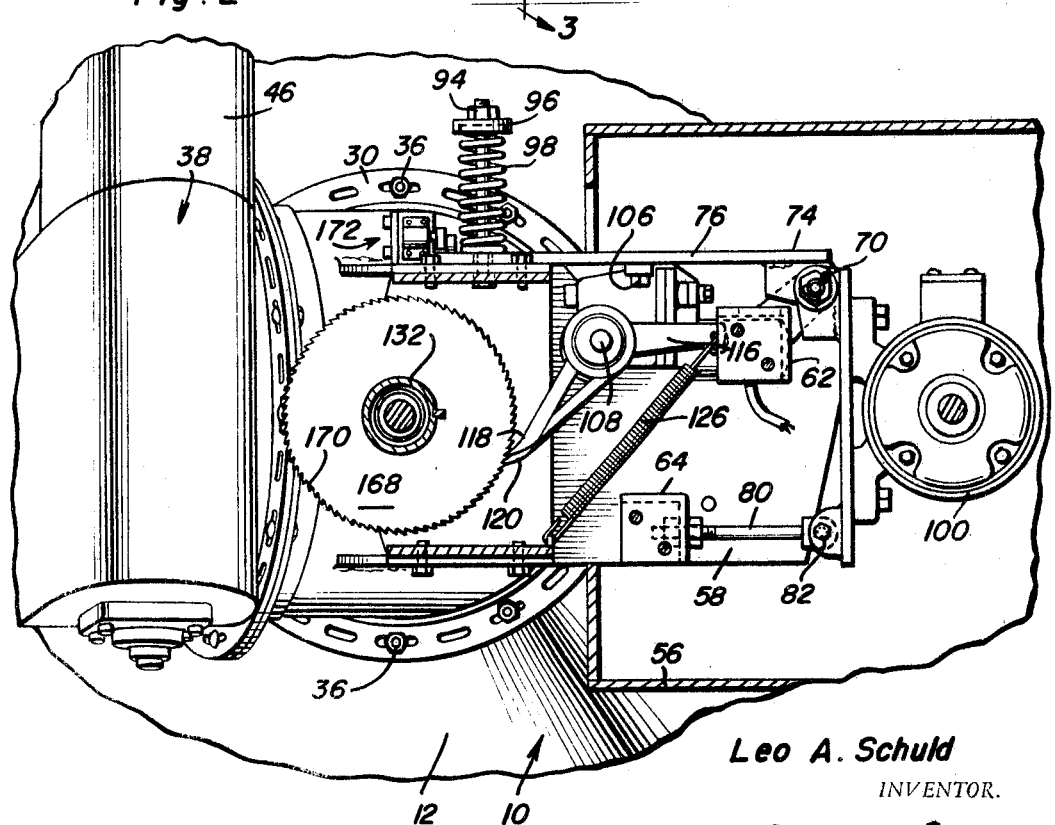
FIGURE 2 is an enlarged fragmentary horizontal sectional view taken substantially upon the plane indicated by the section line 2—2 of FIGURE 1.

It is to be understood that the compression spring 98 and the side wall 76 will be in the position thereof illustrated in FIGURE 2 of the drawings during normal operation of the auger screw 140 and its sweeping about the lower wall portion 12 of the bulk feed bin 10. However, whenever the bulk feed or other material disposed within the feed bin 10 resists the normal driving torque of the wheel 168, the swinging movement of the auger screw 140 will be terminated and the free end edge 86 of the side wall 76 will swing from the position thereof illustrated in FIGURE 2 to the position thereof illustraed in FIGURE 4 by engagement of the ratchet dogs 118 and 120 with the stationary wheel 168. Movement of the side wall 76 to the position thereof illustrated in FIGURE 4 of the drawings will cause sufficient pivotal movement of the actuator 174 for the switch assembly 172 to open and thereby terminate operation of the electric motor 104 while maintaining normal torque on the wheel 168 by the compression spring 98 until such time as the auger screw 140 is able to clear the obstruction and advancement of the wheel 168 and swinging movement of the auger screw 140 is again possible under the biasing action of the compression spring 98. Of course, as soon as the wheel 168 again begins to rotate, the free end edge 86 of the side wall 76 will move toward the position thereof illustrated in FIGURE 2 thereby allowing the spring urged actuator 174 of the switch assembly 172 to move to a position in which the switch assembly 172 will be closed thereby again electrically connecting the motor 104 to a suitable source of electrical potential.

Thus, it may be readily appreciated that the bin unloader of the instrument invention may be readily actuated and run continuously without fear of obstructions within the confines of the lower wall portion 12 of the bulk feed bin 10 overloading the motor 104 which drives the sleeve structure 130, inasmuch as operation of the motor 104 will be automatically terminated each time resistance to swinging movement of the auger screw 140 above a predetermined minimum is encountered.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In combination with a rotary member rotatable about a predetermined axis, a drive assembly, said drive assembly including motor means and power transfer means drivingly coupling said motor means to said rotary member, said power transfer means including means operable automatically in response to resistance of said rotary member to turn increasing to a predetermined magnitude, to terminate operation of said motor means, maintain application of driving torque on said rotary member at generally said predetermined magnitude until resistance to rotation of said rotary member has been lowered to below said predetermined magnitude and said rotary member has been angularly advanced, at least slightly, and then again initiate operation of said motor means, a storage bin including inverted conical lower walls, said axis projecting centrally upwardly through the bottom of said bin, an angulated and driven auger screw journalled from said rotary member for sweeping around said lower walls, said storage bin including an inclined laterally and downwardly directed spout comprising the outlet for the lower end of said bin, said rotary member including an upstanding sleeve journalled through the lower surface portions of said spout intermediate its opposite ends, said sleeve including an upper end portion, an inclined auger screw journalled from said upper end portion and closely overlying the conical lower wall of said bin, driven shaft means journalled through said sleeve portion and drivingly coupled to said auger screw.

2. The combination of claim 1 wherein said power transfer means is shiftable relative to the axis of rotation of said rotary member, force means acting on said power transfer means and biasing the latter toward a first limit position, said power transfer means being shiftable away from said first limit position to a second position during operation of said motor means and when resistance to turning of said mount increases to said predetermined magnitude, said power transfer means including control means operable to terminate operation of said motor means upon shifting of said power transfer means to said second position, said force means, when shifted from said first position toward said second position being disposed in the path of power transfer from said motor to said rotary member and operable to apply generally, said predetermined magnitude of torque on said rotary member until such time as the excess resistance to turning of said rotary member is relieved and the latter has rotated sufficiently, in advance of said motor means under the driving force of said force means, to allow said power transfer means to shift back toward said first from said second position.

3. The combination of claim 1 wherein said power transfer means includes a toothed wheel mounted on said lower sleeve portion for rotation therewith, a driven shaft driven by said motor and generally paralleling the lov portion of said sleeve, an eccentric on said driven sh a drive arm having one end journalled relative to s eccentric and means on the other end including a o way drive with the teeth on said wheel.

4. The combination of claim 3 wherein said pov transfer means also includes a support including a porti shiftable between said first and second positions towa and away from the axis of rotation of said toothed wh generally along a path paralleling said drive arm, s force means acting on said support to shift said supp portion toward the axis of rotation of said toothed whe and said driven shaft being journalled from said supp portion.

5. The combination of claim 3 wherein said mot comprises an electric motor and said control means i cludes electrical circuitry means for electrically conne ing said motor to a suitable source of electrical potenti said electrical circuitry including normally closed swit means, said support being operable to coact with sa switch means to open the latter in response to said porti of said support shifting to said second position.

6. The combination of claim 5 wherein said driv shaft includes a second eccentric, whose center is dispos on the opposite side of the axis of rotation of said driv shaft, from the center of the first mentioned eccentr a second drive arm including one end journalled relati to said second eccentric and a second end including a on way drive connection with said toothed wheel.

7. The combination of claim 1 wherein said pow transfer means includes means for varying said torq input of predetermined magnitude.

8. On combination with a storage bin including a low centrally disposed outlet, an auger screw conveyor a sembly journalled from said bin about an upstanding ax extending through said outlet, said assembly including elongated rotary auger screw extending outwardly fro said axis and swingable thereabout in response to rotatic of said assembly about said axis, first motor means drivin ly connected to said auger screw, second motor mean power transfer means drivingly connecting said secor motor means to said assembly for slowly rotatably a vancing the latter independent of operation of said fir motor means, said power transfer means including mea operable automatically in response to resistance of sa rotary member to turn about said axis increasing to a pr determined magnitude, to terminate operation of sa second motor means, maintain application of drivir torque on said rotary member at generally said pred termined magnitude until resistance to rotation of sa rotary member has been lowered to below said predete mined magnitude and said rotary member has been a gularly advanced, at least slightly, and then again initia operation of said second motor means.

References Cited

UNITED STATES PATENTS

| | | | |
|---|---|---|---|
| 2,493,591 | 1/1950 | Newton | 198—23 |
| 2,675,931 | 4/1954 | Makous | 214—1 |
| 2,878,922 | 3/1959 | Bessette | 198—23 |
| 3,339,759 | 9/1967 | Wellons | 214—1 |

ROBERT G. SHERIDAN, Primary Examiner

U.S. Cl. X.R.

192—150